United States Patent [19]

Wang et al.

[11] Patent Number: 4,863,782

[45] **Date of Patent: * Sep. 5, 1989**

[54] DECORATIVE EMBOSSED SURFACE COVERINGS HAVING PLATEY MATERIAL AND INLAID APPEARANCE

[75] Inventors: C. David Wang, Wilmington, Del.; Jeffrey R. Shultz, Salem, N.J.; Hao A. Chen, Glen Mills, Pa.; James L. Minter, Chillicotte, Ohio; Charles H. Brower, Pennsville, N.J.

[73] Assignee: Mannington Mills, Inc., Salem, N.J.

[ * ] Notice: The portion of the term of this patent subsequent to Jul. 12, 2005 has been disclaimed.

[21] Appl. No.: 121,845

[22] Filed: Nov. 17, 1987

Related U.S. Application Data

[63] Continuation-in-part of Ser. No. 873,379, Jun. 12, 1986, Pat. No. 4,756,951.

[51] Int. Cl.[4] .......................... B32B 3/00; B32B 5/16

[52] U.S. Cl. .................................... 428/204; 428/207; 428/208; 428/304.4; 428/206

[58] Field of Search ............... 428/204, 206, 207, 208, 428/304.4, 67, 158, 203, 363, 401, 542.2, 913.3, 908.8

[56] References Cited

U.S. PATENT DOCUMENTS

| | | | |
|---|---|---|---|
| 1,606,030 | 11/1926 | Higgins . | |
| 1,623,967 | 4/1927 | Moross . | |
| 1,931,667 | 10/1933 | Loetscher . | |
| 2,266,926 | 12/1941 | Vida . | |
| 2,987,102 | 6/1961 | Heinrichs . | |
| 3,049,459 | 8/1962 | Smith et al. . | |
| 3,239,364 | 3/1966 | Carlisle et al. | 428/908.8 |
| 3,265,548 | 8/1966 | Harkins, Jr. et al. | 428/908.8 |
| 3,293,094 | 12/1966 | Nairn et al. . | |
| 3,328,499 | 6/1967 | Barnette . | |
| 3,341,396 | 9/1967 | Iverson . | |
| 3,562,203 | 2/1971 | Grunin et al. . | |
| 4,025,665 | 5/1977 | Hannon . | |
| 4,054,699 | 10/1977 | Brinkley | 428/908.8 |
| 4,090,773 | 5/1978 | Bauer et al. | 428/324 |
| 4,126,727 | 11/1978 | Kaminski | 428/204 |
| 4,159,301 | 6/1979 | Buser et al. . | |
| 4,409,280 | 10/1983 | Wiley et al. | 428/908.8 |
| 4,433,070 | 2/1984 | Ross et al. . | |
| 4,491,616 | 11/1985 | Schmidle et al. | 428/159 |

FOREIGN PATENT DOCUMENTS 870711 5/1971 Canada .

*Primary Examiner*—Nancy A. B. Swisher
*Attorney, Agent, or Firm*—Finnegan, Henderson, Farabow, Garrett & Dunner

[57] ABSTRACT

A decorative surface covering has a transparent or translucent layer containing a plately material that is reoriented at two or more different angles with respect to the surface of the layer to provide a three-dimensional effect to the decorative surface covering. The covering can be chemically embossed to further enhance the three-dimensional effect. Portions of the layer containing the platey material can be masked to produce an inlaid or inset effect.

16 Claims, 4 Drawing Sheets

FIG. 1
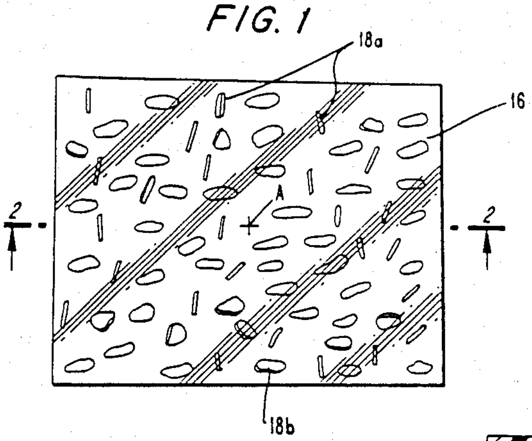
FIG. 2
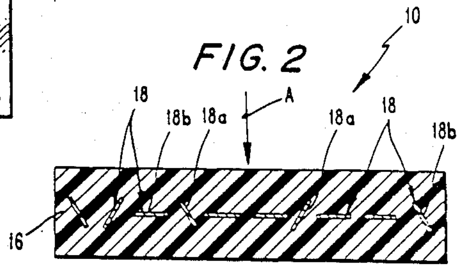
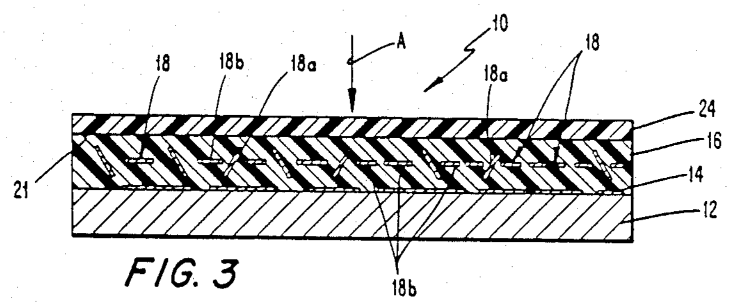
FIG. 3
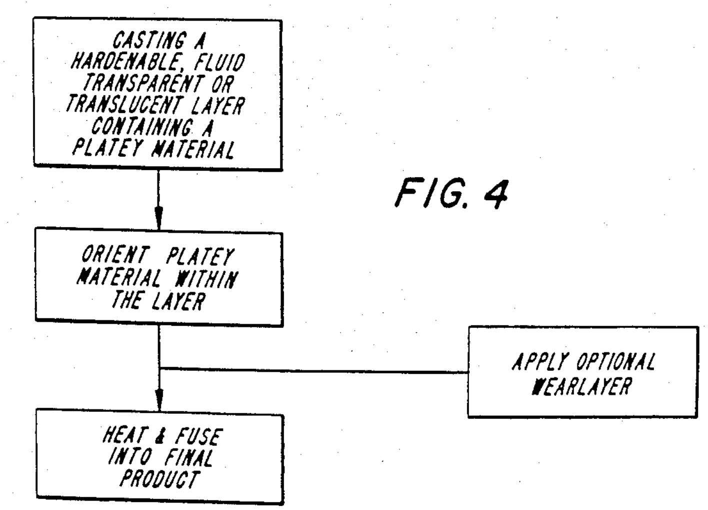
FIG. 4

DECORATIVE EMBOSSED SURFACE COVERINGS HAVING PLATEY MATERIAL AND INLAID APPEARANCE

CROSS-REFERENCE TO RELATED APPLICATION

This application is a continuation-in-part of application Ser. No. 873,379, filed June 12, 1986 U.S. Pat. No. 4,756,951, the entire disclosure of which is relied upon and incorporated by reference herein.

BACKGROUND OF THE INVENTION

This invention relates to decorative surface coverings and, more particularly, to decorative surface coverings having platey material oriented at two or more different angles with respect to the surface.

Decorative surface coverings have a wide range of uses, such as surface coverings for use as a floor, a wall, or a ceiling, a desk, a table, or a countertop; surface layers on leather, fabrics, paper, wood, metals, and glass; upholstery, drapery, and clothing materials; interiors for cars, trucks, boats, airplanes, and other means of transportation; covers for books and other publications and like articles. These decorative surface coverings typically contain a platey material in one or more layers of the surface covering.

When these platey materials are contained in one or more transparent or translucent layers within the surface covering, the platey material is visible. A person viewing the decorative surface covering sees a lustrous pearlescent appearance, because the flat or platey side of the platey material is oriented mainly parallel to the horizontal surface of the decorative covering so as to be perpendicular to the angle of view. The platey material has a length and width that exceeds its thickness and is reflective to light.

Generally, manufacturers of decorative surface coverings attempt to maintain the flat or platey side of the platey material, such as a pearlescent pigment, substantially parallel to the horizontal surface of the decorative surface covering to obtain a decorative surface covering in which as much of the platey material as possible is in such a substantial parallel alignment. These manufacturers desire such a parallel alignment because they wish to produce a uniform or smooth, optimally pearlescent effect in the resulting decorative surface covering by having the flat or platey side of the platey material presented perpendicular to the angle of view. Consequently, one viewing the decorative surface covering would see the flat or platey side of the platey material in a parallel alignment.

Indeed, previous techniques of manufacturing decorative surface coverings prefer not to disturb the platey material, such as the pearlescent pigment-containing layer, during manufacture because a uniform or smooth visual effect was desired. Previously, the art believed that by disturbing the parallel alignment of the platey material, undesirable diffractions are obtained in the decorative surface covering so as to detract from or destroy the normally desired sheen of the decorative surface covering.

However, decorative surface coverings having platey material, such as pearlescent pigments, in a parallel alignment do not always impart to the decorative surface covering the desired appearance of an enhanced three-dimensional effect. Such a three dimensional effect is extremely pleasing in a decorative surface covering because it provides an overall appearance of depth and beauty to the decorative surface covering.

Especially, when the decorative surface covering is produced to simulate a marble or other natural material, the lack of such an enhanced three-dimensional effect in the decorative surface covering hinders the ability of the decorative surface covering to simulate these designs. Consequently, the insistence in the art of maintaining the platey material, such as pearlescent pigments, in a parallel alignment relative to the horizontal surface of the decorative surface covering significantly detracts from and thwarts the formation of an enhanced three-dimensional effect in the decorative surface covering.

It is also known in the art that building materials having different textures, colors and designs can be combined to create an inlaid or inset appearance. This technique is frequently employed, for example, when ceramic tile, marble, granite or other stone materials are inlaid on a floor or wall to produce a particular decorative or artistic effect. It would be desirable to have a decorative surface covering that imitates the visual effect obtained by inlaying and insetting natural or synthetic materials. It would be highly desirable if the decorative surface covering also exhibited a three-dimensional effect resembling natural materials.

SUMMARY OF THE INVENTION

The inventors of the present invention have developed a unique decorative surface covering that overcomes the significant and inherent disadvantages present in previous decorative surface coverings. Unlike previous decorative surface coverings the decorative surface covering of the present invention exhibits a highly desirable and attractive enhanced three-dimensional effect. This effect can be further enhanced by embossing the covering. Consequently, the decorative surface covering of the present invention presents three-dimensional effect that permits a rendering of natural type formations, such as, but not limited to marble or granite.

In addition, the decorative surface covering of this invention can be provided with printed areas that create different visual impressions that resemble the inlaid or inset appearances obtained when materials having different colors or textures are combined. For example, it is possible to mask a desired, preselected area of the surface covering exhibiting the enhanced three-dimensional effect to obtain an inset effect on the covering.

The present invention achieves these various advantages by providing a decorative surface covering, a method of forming the decorative surface covering, and an apparatus to form the decorative surface covering. The decorative surface covering comprises: (a) a transparent or translucent layer; and (b) platey material distributed throughout the layer. The platey material is substantially reoriented at two or more different angles with respect to the surface of the layer to provide an enhanced three-dimensional effect to the decorative surface covering.

More particularly, in one embodiment of the invention, the decorative surface covering comprises a substrate including a foamable resinous layer containing a foaming or blowing agent. A printing design overlies at least a portion of the foamable resinous layer. At least a portion of the printing design is comprised of a printing ink composition containing a foaming or blowing agent modifier in an amount sufficient to permeate into the foamable resinous layer and to modify or inhibit foaming in the foamable resinous layer. A transparent or translucent first layer overlies the substrate and the printing design. Platey material is distributed throughout the first layer. The platey material is substantially reoriented at two or more different angles with respect to the surface of the first layer, whereby the platey material reflects or diffracts light at various angles as the light passes within the transparent or translucent layer to provide an enhanced three-dimensional effect to the decorative surface covering.

In another embodiment of the invention, the transparent or translucent first layer containing the reoriented platey material is interposed between the foamable resinous layer and the printing design. In this embodiment, the printing ink composition contains the foaming or blowing agent modifier in an amount sufficient to permeate through the first layer containing the platey material and into the foamable resinous layer to modify foaming in the foamable resinous layer.

In a further embodiment of the invention, the decorative surface covering comprises the substrate including the foamable resinous layer containing the foaming or blowing agent, a transparent or translucent first layer containing the reoriented platey material overlying the substrate, and a transparent or translucent second layer covering the first layer. The printing design is applied over at least a portion of a smooth surface of the second transparent or translucent layer. At least a portion of the printing design is comprised of the printing ink composition containing the foaming or blowing agent modifier in an amount sufficient to permeate through the first layer and through the second layer and into the foamable resinous layer to modify foaming in the foamable resinous layer.

This invention also provides methods for forming the decorative surface coverings. One method comprises providing a substrate comprising a foamable resinous layer containing a foaming or blowing agent. A printing design is applied over at least a portion of the foamable resinous layer, wherein at least a portion of the printing design is comprised of a printing ink composition containing a foaming or blowing agent modifier in an amount sufficient to modify foaming in the foamable resinous layer of the substrate. A hardenable, fluid, transparent or translucent first layer is cast onto the foamable layer. The first layer contains the platey material. The platey material is reoriented within the first layer at two or more different angles with respect to the surface of the first layer, whereby the platey material reflects or diffracts light at various angles as the light passes within the transparent or translucent layer to provide an enhanced three-dimensional effect to the decorative surface covering. In a preferred embodiment, a hardenable, fluid, transparent or translucent wear layer is applied over at least a portion of the first layer. In another embodiment, the resinous layer is selectively foamed to form a decorative surface that is embossed in a region proximate the portion of the printing design that contained the foaming or blowing agent modifier.

This invention provides a similar method, except that the hardenable, fluid, transparent or translucent first layer containing platey material is cast onto the foamable layer, the platey material is reoriented as previously described, and the printing design is applied over at least a portion of the first layer. At least a portion of the printing design is comprised of a printing ink composition containing a foaming or blowing agent modifier in an amount sufficient to permeate through the first layer and into the foamable resinous layer to modify foaming in the foamable resinous layer of the substrate. In another embodiment, the resulting composite is aged for a time and at a temperature sufficient for the foaming or blowing agent modifier to permeate into the foamable resinous layer. In a further embodiment, a hardenable, fluid, transparent or translucent wearlayer is applied over at least a portion of the first layer. In still another embodiment, the resinous layer is selectively foamed to form a decorative surface covering that is embossed in a region proximate the portion of the printing design that contained the foaming or blowing agent modifier.

This invention provides still another method for forming the decorative surface covering. This method is similar to the second method, except that a second, hardenable, fluid transparent or translucent second layer is applied over at least a portion of the first layer before the printing design is applied. The second layer has a smooth outer surface, and the printing design is applied over at least a portion of the smooth surface of the second layer. At least a portion of the printing design is comprised of a printing ink composition containing a foaming or blowing agent modifier in an amount sufficient to permeate through the first layer and through the second layer and into the foamable resinous layer to modify or inhibit foaming in the foamable resinous layer. In another embodiment, the resulting composite is aged for a time and at a temperature sufficient for the foaming or blowing agent modifier to permeate through the second layer and through the first layer and into the foamable resinous layer. In still another embodiment, the resinous layer is selectively foamed to form a decorative surface covering that is embossed in a region proximate the portion of the printing design that contained the foaming or blowing agent modifier. A wearlayer can be provided over the printing design.

Finally, the present invention provides an apparatus for forming a decorative surface covering having an enhanced three dimensional effect. The apparatus comprises means for casting a hardenable, fluid, transparent or translucent first layer containing a platey material unto a substrate, which includes a foamable resinous layer containing a foaming or blowing agent. Means are provided to reorient the platey material to form a distributed pattern of platey material within the first layer, the platey material being reoriented at two or more different angles with respect to the surface of the first layer, whereby the platey material reflects or diffracts light at various angles as the light passes within the transparent or translucent layer to provide an enhanced three-dimensional effect. Means are also provided for applying a hardenable, fluid, transparent or translucent second layer over at least a portion of the first layer. The apparatus includes means for applying a printing design over at least a portion of the second layer. The apparatus can optionally be provided with means for applying a wear layer over the printing design, and optional heating means for heating the resinous layer to a temperature sufficient to expand the resinous layer by faming.

The present invention overcomes the numerous inherent disadvantages commonly associated with previous decorative surface coverings and their associated processes and obtains the various advantages of the invention. By reorienting the platey material in the transparent or translucent layer at two or more different angles with respect to the surface of the layer, the decorative surface covering of the present invention provides a highly desirable, enhanced three-dimensional effect to the decorative surface covering.

Preferably, the platey material is nacreous pearlescent pigments that have their platey sides reoriented relatively parallel to the horizontal surface of the translucent or transparent layer to exhibit a lustreous pearlescent appearance. In such an embodiment, the pearlescent pigments reoriented at an angle substantially vertical to the surface have a significantly reduced pearlescent appearance and, hence, create an enhanced three-dimensional effect through swirls and streaking lines that enhance the marble-like appearance of the decorative surface covering.

Consequently, the present invention significantly advances over the state of the art. The decorative surface coverings of the present invention exhibit not only a pearlescent lustreous effect, but also possess an enhanced three-dimensional appearance that allows the decorative surface covering to simulate marble or other natural designs. By embossing the surface covering, the three-dimensional appearance can be further enhanced.

Moreover, an inlaid or inset appearance can be obtained by masking at least a portion of the surface covering exhibiting the three-dimensional appearance. In addition, by masking in register with embossed areas of the covering, a more realistic inlaid appearance can be created since the pearlescent, lustreous areas can be covered in the embossed regions.

The foregoing and other features and advantages of the present invention will be made more apparent from the following description of the preferred embodiments.

BRIEF DESCRIPTION OF THE DRAWINGS

The accompanying drawings not drawn to scale are incorporated in and constitute a part of the specification, illustrate various embodiments of the invention and, together with the following description, serve to explain the principles of the invention.

FIG. 1 is a top view of a decorative surface covering of the present invention.

FIG. 2 is a fragmentary cross-sectional view of the decorative surface covering of FIG. 1 taken along line 2—2.

FIG. 3 is a fragmentary cross-sectional view of an alternative embodiment of the decorative surface covering of the present invention.

Both FIG. 2 and 3 show only a monolayer of platey material within a transparent or translucent layer. The invention contemplates multiple layers of platey material.

FIG. 4 is a flow diagram illustrating a process of the present invention.

DESCRIPTION OF THE PREFERRED EMBODIMENTS

Figure 5:
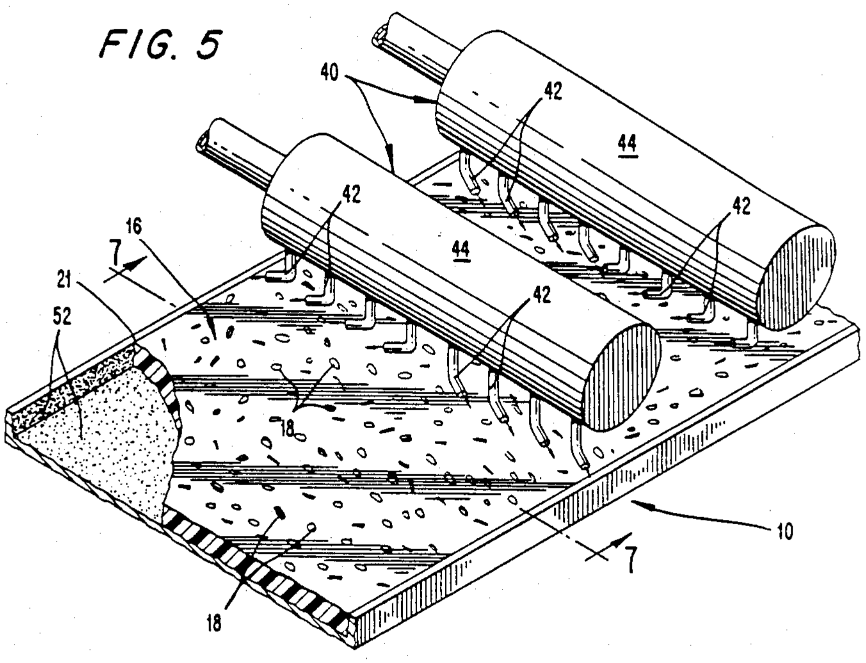
FIG. 5 is a perspective view of an apparatus of the present invention.

The present invention provides a decorative surface covering. The decorative surface covering has a transparent or a translucent layer. A platey material is distributed throughout the layer. The platey material is reoriented at two or more different angles with respect to the surface of the transparent or translucent layer to provide an enhanced three-dimensional effect to the decorative surface covering.

In accordance with the present invention, the decorative surface covering has a transparent or translucent layer. As shown in FIGS. 1 and 2, a decorative surface covering 10 has a translucent or transparent layer 16.

The transparent or translucent layer 16 can be made from various transparent or translucent materials known in the art, such as plastisol. Preferably, the transparent layer 16 is a polyvinyl chloride (PVC) plastisol composition, which is a dispersion of finely divided resin in a plasticizer. A typical plastisol composition is 100 parts resin and 50 parts plasticizer that form a paste that gels when heated sufficiently as a result of the solvation of the resin particles by the plasticizer.

The resin used in the PVC plastisol is typically a synthetic resin, such as a homopolymer or copolymer of vinyl chloride. Various additives known in the art can be added to the PVC plastisol, such as, but not limited to, light and heat stabilizers, UV absorbers, and/or solvents. Typically, the transparent or translucent layer is between about 0.5 mils to about 1,000 mils in thickness and, preferably, is in the range of about 5 mils to about 30 mils.

As shown in FIG. 3, in one embodiment, the decorative surface covering 10 can also have a substrate 12 underlying the transparent or translucent layer 16. A design 14 can also be printed on the substrate 12. Various substrates known in the art can be used, such as release paper, paper, foil, wood, metal, fabric, and/or, for example, a natural or synthetic fibrous sheet material, such as felt. The fibrous sheet materials include fibers, such as cellulose, asbestos, fiberglass, polypropylene, polyethylene, polyester, etc. and combinations thereof.

The substrate 12 can also include a foamable resinous layer selected from those known in the art. For example, referring to FIGS. 9, 10 and 11, the substrate includes a felt layer 60 covered by a foamed layer 62. The foamed layer can be formed from a resinous composition that can include a synthetic resin, such as a homopolymer or a copolymer of vinyl chloride. The resinous composition can also include various blowing or foaming agents, accelerators, catalysts, stabilizers to reduce the harmful effects of degradation due to light and heat, primary and secondary plasticizers, pigments, fillers, and other conventional and well-known additives.

The foamable resinous containing substrate 12 as shown in FIG. 3 is formed by various techniques known in the art, such as reverse roll coating, screen coating, knife coating, air knife coating, and flexible blade coating. The substrate 12 typically has a thickness in the range of about 0.5 mils to about 1,000 mils and, preferably, in the range of about 10 mils to about 50 mils.

The design 14 can be printed on the substrate 12 by various techniques known in the art. The appropriate technique and composition for the design are selected to achieve the desired design and color on the substrate 12. Examples of such printing techniques include direct or indirect rotogravure printing, flexographic, or screen printing. Appropriate printing ink compositions include, but are not limited to, homopolymers and copolymers of vinyl chloride, acrylic, and mixtures thereof. The printing ink composition can contain various additives known in the art, such as foaming agents, foaming agent modifiers, inhibitors and pigments. The composition can be transparent, translucent or opaque, depending upon the function of the composition and the visual effect desired.

A design can be imprinted upon the upper surface, the lower surface or both surfaces of the transparent or translucent layer containing the platey material. Additionally, this invention contemplates a decorative surface covering that includes a plurality of transparent or translucent layers containing a platey material and/or a plurality of other transparent or translucent layers wherein a printing design can be printed upon some or all of such layers. For example, the transparent or translucent layer containing the platey material can be at least partially covered by another transparent or translucent layer having a surface to which a printing design can be applied. Preferably, the surface is smooth. This facilitates good printing, since the smooth surface readily accepts the printing ink composition and aids in leveling of the composition.

In accordance with the present invention, platey material is distributed throughout the translucent or transparent layer. The platey material is substantially reoriented at two or more different angles with respect to the surface of the layer to provide an enhanced three-dimensional effect to the decorative surface covering. As illustrated in FIGS. 1–3, the transparent or translucent layer 16 contains platey material 18 distributed throughout the layer 16. The platey material 18 is substantially reoriented at two or more different angles with respect to the surface 21 of the layer 16, as shown in FIGS. 1–3.

As used herein, the term "platey material" indicates a material having a length and width that are larger than the thickness of the material with the material being substantially reflective to light. The platey material appears flake-like or platelet-like. The platey material can be those conventionally used in the art. Acceptable platey material can include thermoplastic, metallic, organic and inorganic filler materials, such as polyester flakes, mica, nacreous pearlescent pigments, aluminum flakes, and mixtures of these materials. Examples of suitable platey material are provided in Woodhams et al., High Aspect Ratio Mica and Other Flake Reinforcement, Handbook of Fillers and Reinforcements for Plastics (edited by Harry S. Katz and John V. Milewski) 333–70. The pearlescent pigments are about 0.1% to about 20% by weight of the transparent or translucent layer and, preferably, are about 0.5% to about 5% by weight.

Typically, as shown in FIGS. 1–3, a first portion of the platey material 18, such as pearlescent pigments **18*a*, are positioned substantially vertical to the surface 21 of the transparent or translucent layer. A second portion of platey material 18, such as pearlescent pigments 18*b*, are positioned substantially horizontal to the surface 21. As a result, the transparent or translucent layer 16 contains platey material at varying angles with respect to the surface 21 so that the light passing into the transparent or translucent layer 16** reflects at two or more angles off the platey material.

The platey material 18 that is oriented within the transparent or translucent layer 16 provides an enhanced three-dimensional effect to the decorative surface covering because some of the platey material, such as the substantially vertical platey material **18*a*, lies substantially vertical with respect to the horizontal surface 21 of the transparent or translucent layer 16, while other platey material, such as platey material 18*b*, lies substantially horizontal to the horizontal surface 21. As a result, these different angles at which the platey material 18*a* and 18*b* are reoriented within the transparent layer 16 reflect and diffract light at various angles as the light passes within the transparent or translucent layer 16. Consequently, one viewing the decorative surface covering, such as from angle A in FIGS. 2 and 3, perceives the platey material to be at various angles within the transparent or translucent layer 16**. Hence, an enhanced three-dimensional effect is created.

In one embodiment, when the platey material is nacreous pearlescent pigments, the pearlescent pigments **18*b* that are substantially horizontal to the horizontal layer 21 of the transparent or translucent layer 16 produce an enhanced lustreous pearlescent appearance. In contrast, the pearlescent pigments 18*a* that are substantially vertical with respect to the horizontal layer 21 possess a reduced pearlescent appearance. Consequently, the varying angles of the platey material 18 create differing lustre to give the appearance of a swirling or streaking effect within the transparent or translucent layer 16**.

The orientation of the platey material can be either uniformly or randomly distributed in the transparent or translucent layer. Likewise, the platey material can be either continuously or intermittently distributed in the transparent or translucent layer.

Figure 8:
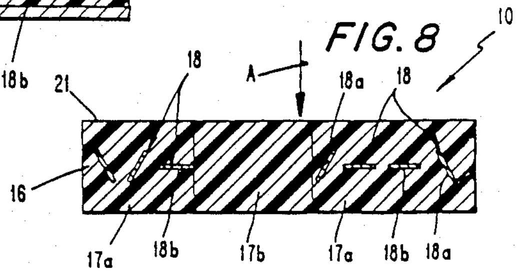
FIG. 8 is a cross-sectional view of a decorative surface covering according to the present invention that shows an intermittently reoriented platey material within the transparent or translucent layer.

In one embodiment of the present invention, the platey material can be intermittently distributed in the transparent or translucent layer. As shown in FIG. 8, the transparent or translucent layer 16 can be composed of segments 17 some of which, such as segment **17*a*, have platey material 18 distributed within the transparent or translucent layer 16 and some of which, such as segments 17*b*, do not contain platey material 18. This intermittent distribution can be achieved by a number of methods. For example, the segment 17*a* containing platey material 18 can be selectively deposited on a substrate and then the platey material 18 can be reoriented within the transparent or translucent layer 16. After this reorientation, the segment 17*b* containing no platey material is deposited on the substrate. Alternatively, segments 17*a* containing the platey material 18 and segments 17*b* lacking platey material can be selectively deposited on the substrate. The platey material 18 in segments 17*a*** are then reoriented so that the platey material forms two or more different angles with respect to the surface of the layer to provide an enhanced three-dimensional effect.

The platey materials 18 distributed within the transparent or translucent layer 16 typically have lengths in the range of about 5 microns to about 50 microns, widths in the range of about 5 microns to about 50 microns, and thicknesses in the range of about 0.2 microns to about 0.8 microns. The platey material is preferably 0.1% to about 20% by weight of the transparent or translucent layer.

The decorative surface covering 10 can also have a transparent wearlayer or protective layer overlying the transparent or translucent layer containing the platey material. For example, as shown in FIG. 3, a transparent or translucent wearlayer 24 overlies the transparent or translucent layer 16. The wearlayer 24 can be made from various transparent or translucent compositions known in the art, such as a PVC plastisol composition. The wearlayer or protective layer typically has a thickness in the range of about 0.5 mils to about 1000 mils and, preferably, in the range of about 5 mils to about 30 mils.

Figure 10:
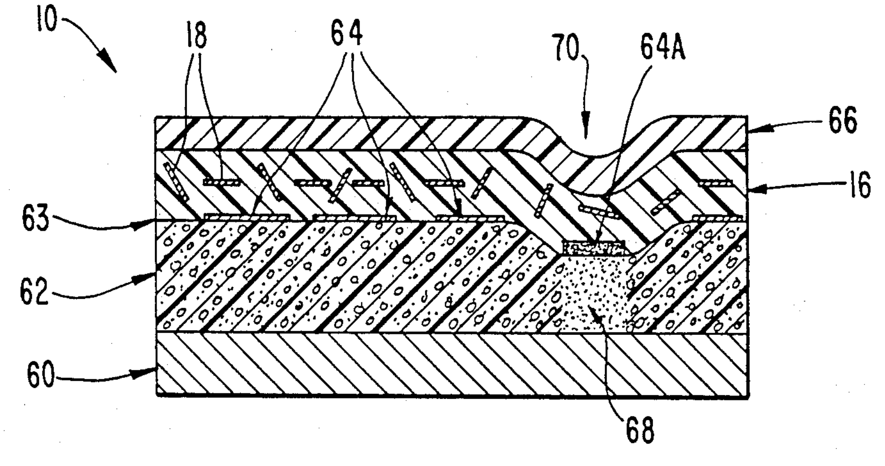
FIG. 10 is a cross-sectional view of a decorative surface covering of the invention in which a transparent or translucent second layer overlies the transparent or translucent first layer containing reoriented platey material.
Figure 11:
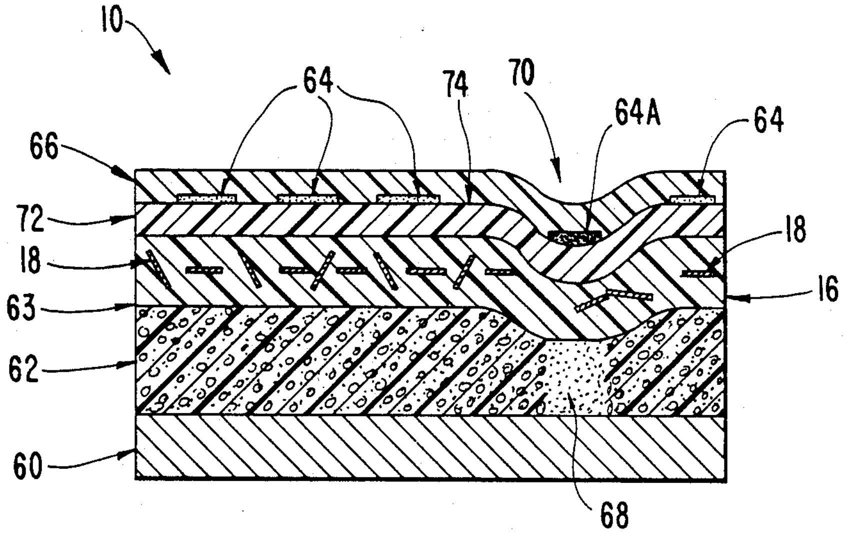
FIG. 11 is a cross-sectional view of a decorative surface covering of the invention in which a plurality of layers and a printing design overlie the transparent or translucent layer containing reoriented platey material.

The decorative surface covering 10 of the present invention can be embossed by various techniques known in the art, such as mechanical and chemical embossing, to achieve various desired decorative effects within the decorative surface covering 10. Embossed coverings are shown in FIGS. 9, 10 and 11.

Figure 9:
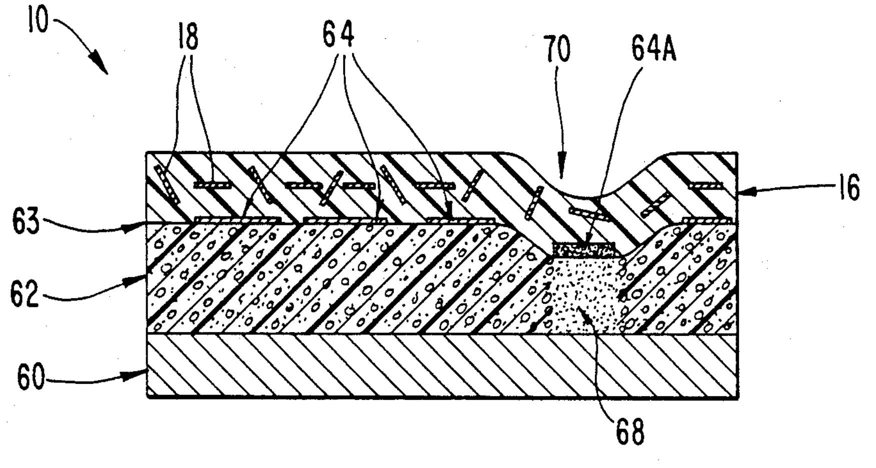
FIG. 9 is a cross-sectional view of a decorative surface covering in which a printing design underlies the transparent or translucent layer containing reoriented platey material.

Referring to FIG. 9, the decorative surface covering 10 of the invention is comprised of a substrate including a felt layer 60 and a foamed layer 62 covering the felt layer. The foamed layer 62 is derived from a conventional foamable and expandable resinous composition, such as a heat-foamable composition. For example, a plasticized polyvinyl chloride resin containing a thermally decomposable blowing agent can be employed.

A transparent or translucent first layer 16 containing displaced platey material 18 that is substantially reoriented at two or more different angles with respect to surface 63 of the first layer 16 overlies the foamed layer 62.

A printing design 64 is provided between the first layer 16 and the foamed layer 62 in FIG. 9. The printing design covers at least a portion of the foamed layer 62, and preferably is applied to selected areas of the layer. The printing design can aid in providing a decorative effect to the surface covering 10, or the design can aid in the process of manufacturing by altering the physical characteristics of the covering, or the design can perform both functions. For example, the printing design shown in FIG. 9 has a main portion 64 that predominantly gives a decorative effect. A resinous portion 64A of the design contains a foaming or blowing agent modifier that retards or otherwise controls foaming in the region 68 of foamed layer 62 during the manufacturing process. A conventional regulator or inhibitor that controls decomposition of the blowing agent in the foamable precursor of layer 62 can be employed. By selective expansion of the layer 62 during the manufacturing process, an enhanced embossed appearance is obtained due to the depression 70 in the region above the portion 64A as is evident from FIG. 9.

A similar decorative surface covering is depicted in FIG. 10. The covering shown in FIG. 10 differs from the covering in FIG. 9 by the addition of a transparent or translucent second layer 66 over the first layer 16. The second layer 66 can function as an additional wearlayer to protect the printing design 64 and 64A during use of the decorative surface covering 10.

Another embodiment of the invention is shown in FIG. 11. The decorative surface covering 10 in FIG. 11 includes a transparent or translucent layer 72 interposed between the layer 16 containing the platey material and the wearlayer 66. Layer 72 has a smooth surface 74 on which the printing design 64, 64A can be applied. The intermediate layer 72 can be comprised of a variety of different materials, for example, polymers and copolymers of suitable monomers, such as vinyl chloride, capable of functioning as a substrate for the printing composition. A PVC plastisol composition has been found to be suitable for this purpose. The intermediate layer typically has a thickness of about 0.5 mil to about 20 mils, and preferably about 2.5 mils to about 4 mils.

It will be understood that the decorative surface covering of the invention can also be comprised of a foamed layer covered by a transparent or translucent first layer containing displaced platey material that is substantially reoriented at two or more different angles with respect to the surface of the first layer. A transparent or translucent second layer can cover the underside of the foamed layer, and a printing design can be applied to the second layer. The printing design can be transparent or opaque and can contain a foaming or blowing agent modifier when it is applied to the second layer to permeate through the second layer and into the foamable layer to control decomposition of the foaming or blowing agent. The first layer, the second layer, or both layers can be covered with wearlayers.

The printing design can include a chemical embossing agent as a foaming or blowing agent modifier during manufacture of the foamed layer 62. When one or more intermediate layers, such as layers 16 and 72, are interposed between the foamed layer 62 and the printing design 64, 64A, then the chemical embossing agent must be capable of penetrating both the intermediate layer 72 and the decorative covering 16 to modify foaming or blowing in the layer 62.

As used herein, the expression "foaming or blowing agent modifier" includes both inhibitors and accelerators that affect foaming or blowing. Examples of suitable foaming or blowing agent accelerators are organometallic compounds, such as zinc octoate and lead octoate, and inorganic metal oxides, such as zinc oxide and lead oxide. Examples of suitable foaming or blowing agent inhibitors are those selected from the group consisting of benzotriazole, tolytriazole, aminotriazole, trimellitic anhydride and fumaric acid. It has been found that benzotriazole (BTA) is particularly effective as a foaming or blowing agent modifier when applied to vinyl intermediate layer(s), since the BTA permeates the intermediate layer to a sufficient extent to provide a predictable and reproducible decrease in foaming in the region 68 below the portion 64A of the design.

The benzotriazole as an inhibiting modifier can be incorporated in a vehicle, which may or may not be inert. By the term "inert" it is meant that the vehicle and benzotriazole do not react to such an extent that the benzotriazole is prevented from performing its intended function. It is preferred that the vehicle be in a liquid state under the printing conditions. Resinous vehicles comprised of liquid, water-based or organic solvent systems can be employed. A particularly preferred solvent system is comprised of methyl ethyl ketone, methyl isobutyl ketone and methanol, for example in a weight ratio of 2.8:1.7:1. It will be understood that the printing ink composition can also contain additives, such as colorants, printing aids, and opacifying agents, to obtain a particular visual effect.

The benzotriazole is employed in the printing ink composition in an amount sufficient to penetrate the optional intermediate layer and the decorative layer containing platey material and to modify foaming or blowing in the foamable layer of the substrate to provide the desired embossing depth. The amount of embossing depth depends upon the identity and thickness of the intermediate layer, the concentration of benzotriazole in the printing ink composition, the thickness of the printing ink composition on the intermediate layer, the ease with which benzotriazole permeates the layer, the time allotted for the benzotriazole to permeate the layer and processing temperature. The amount of benzotrizaole to be applied to the intermediate layers is generally proportional to the thickness of the layer; as the thickness increases the amount of benzotriazole should be increased within limits known to those skilled in the art. In some circumstances, increasing the processing time or increasing the processing temperature or both can increase the rate of migration of the benzotriazole through the layers, and thus make it possible to use a smaller amount of BTA. Similar considerations affect the use of other foaming or blowing agent modifiers.

It has been found that reproducible embossing results can be obtained by applying a printing ink composition containing about 10% to about 40% by weight benzotriazole in a solvent vehicle containing, for example, resin binders, colorants, printing aids and solvents, to an intermediate layer 72 having a preferred thickness of about 2.5 to about 4 mils dry thickness, where the intermediate layer covers a decorative layer 16 having a preferred dry film thickness of 7 to 15 mils, and then aging the resulting composite at a temperature of about 40° F. to about 100° F. for about a day to about 10 days, preferably about 8 to about 10 days, prior to activating the blowing agent in the layer 62. Aging time can be decreased by increasing aging temperature. Alternatively, the composite can be heated at an elevated temperature to reduce the aging time. For example, it has been found sufficient to heat the composite at about 300° F. to about 350° F. for about 1 minute to about 15 minutes followed by activation of the blowing agent.

The decorative surface covering 10 can be set by various techniques known in the art, such as heat fusion. For example, in heat fusion, various temperatures and times known within the art, such as a temperature of about 300° F. to about 450° F. and a dwell time of about 2 min. to 5 min., can be used to fuse the decorative surface covering 10. Of course, the time and temperature depend, in part, upon the composition of the various layers of the decorative surface covering 10.

The resulting decorative surface covering has a variety of uses. For example, it can be used as a decorative surface covering for a floor, wall, or ceiling, as well as a desk, table, or countertop. The decorative covering can be readily applied to these surfaces by various techniques well known in the art.

The present invention also provides a method of forming a decorative surface covering. In accordance with the method, a hardenable fluid transparent or translucent layer containing a platey material is cast. As discussed above and depicted in FIGS. 1–4, the transparent or translucent layer 16 contains platey material 18. In one embodiment, the reoriented platey material, such as nacreous pearlescent pigments, is uniformly distributed within the transparent or translucent layer. In another embodiment, the reoriented platey material is nonuniformly distributed within the transparent or translucent layer. Likewise, the reoriented platey material can also be randomly or intermittently distributed within the transparent or translucent layer.

Various techniques known in the art, as discussed above, can be used to cast and set the fluid transparent or translucent layer 16. Various techniques and apparatus also known in the art can be used to distribute the platey material within the transparent or translucent layer 16.

In accordance with the method, the platey material is reoriented within the transparent or translucent layer at two or more different angles with respect to the surface of the layer to provide an enhanced three-dimensional effect to the decorative surface covering. A first portion of the platey material is preferably reoriented substantially vertical to the surface of the layer and a second portion of the platey material is preferably oriented substantially horizontal to the surface of the layer. Various techniques, as discussed below, can be used to create such an orientation among the platey material, such as nacreous pearlescent pigments.

In one embodiment of the present invention, the platey material is reoriented by positionally directing onto the transparent or translucent layer a plurality of jet streams. As a result, the normally horizontal platey material is sufficiently disturbed so that at least a portion of the platey material is reoriented to lie at various angles with respect to the surface of the layer. Preferably, the jet streams, such as air or gaseous streams, are from a plurality of nozzles, some or all of which are pulsating and which may be controlled or programmed by various computer control devices and/or programs. The nozzles can be adapted to oscillate back and forth across the transparent or translucent layers.

In another embodiment of the method of the invention, a decorative surface covering is prepared by mechanical contact with a device that reorients the platey material within the transparent or translucent layer 16. For example, a foamable layer can be formed and a wet layer of about 10 mils to about 15 mils thickness comprising a PVC plastisol layer containing platey material can be cast o the foamable layer. A mechanical apparatus with pattern creating head is set up to barely contact the wet, transparent or translucent plastisol layer containing the platey material. An aesthetic effect of unique design is created by reorienting the platey material at the contact area. Designing the pattern creating head as comb shape and alternately moving the head in ordinate and abscissa directions, a desirable geometric coordinate pattern is created. Utilizing varied head designs, it is possible to produce all possible desirable patterns. About 3 mils to about 5 mils of transparent or translucent resinous polymeric material can be layed down to provide a smooth base 72 for subsequent printing. A predetermined design which contains diffusable foaming retarders can provide capability through the resinous transparent or translucent second layer and through the transparent or translucent first layer containing platey material. A resinous polymeric wearlayer can be coated on the product after an appropriate aging time has taken place. The entire product can then be heated to fuse the layers and to foam the foamable layer.

In a further embodiment of the method of the invention, the platey material is reoriented within the transparent or translucent layer by applying a surfactant, such as a silicone, water, or other suitable material to the transparent or translucent layer containing the platey material in an amount effective to reduce the surface tension of the liquid transparent or translucent layer. Suitable silicone surfactants include silicone oil and silicone polymers.

Preferably, the surfactant, such as silicone oil, is applied over or under the transparent or translucent layer containing the platey material. As a result, the platey material is oriented at two or more different angles with respect to the surface of the layer and, thereby, form what appear to be circular and concave shapes, such as swirls or streaking lines, in the transparent or translucent layer 16.

A printing ink composition can be applied in the form of a transparent or opaque design over at least a portion of the decorative layer 16, foamable layer 62, the intermediate layer 72, or combinations of any or all of these layers. Preferably, the printing ink composition is applied to selected areas of the layer. An inlaid or inset effect can be obtained on the decorative surface covering by employing the printing ink composition to form a design that masks selected areas of the covering exhibiting a pearlescent, lustreous appearance. By applying the design in register with embossed regions of the covering, the inlaid or inset effect can be further enhanced.

The present invention further provides an apparatus for forming a decorative surface covering. The apparatus comprises: (a) a means for casting a fluid transparent or translucent layer containing a platey material; and (b) a means to reorient the platey material to form a distributed pattern of platey material within the fluid transparent or translucent layer. The platey material is reoriented at two or more different angles with respect to the surface of the layer to provide an enhanced three-dimensional effect.

Figure 6:
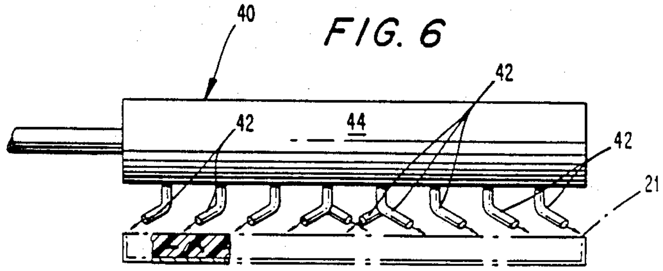
FIG. 6 is a side view of the apparatus of FIG. 5.
Figure 7:
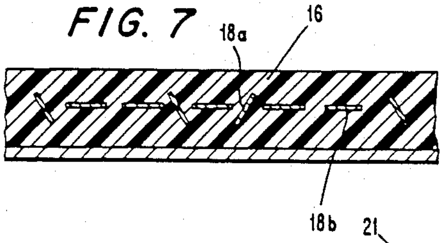
FIG. 7 is a cross-sectional view of the decorative surface covering of the present invention taken along line 7—7 in FIG. 5.

In one embodiment of the present invention, the orienting means is a plurality of nozzles capable of positionally directing the platey material within the transparent or translucent layer. In FIGS. 5–6, an apparatus 40 has a plurality of nozzles 42 that are capable of positionally directing and, hence reorienting, the platey material within the transparent or translucent layer 16. Preferably, the nozzles 42 are divided into various groupings, with each grouping being attached to a manifold 44.

The apparatus 40 can contain one or more manifolds 44, each having a plurality of nozzles 42, to create the desired distribution of the platey material in the transparent or translucent layer. The number of manifolds 44 and the number of nozzles 42 will vary depending upon, in part, the desired size, shape, type and design of the decorative surface covering being formed. Similarly, the operation of the manifolds 44 and nozzles 42 can be altered so that the platey material is reoriented continuously, intermittently, randomly, uniformly, or combinations thereof in the transparent or translucent layer.

In such an embodiment, the reorienting means is a jet stream, such as an air stream, emitted from each nozzle that is directed onto the transparent or translucent layer containing the platey material to reorient the platey material at two or more different angles with respect to the surface 21 of the transparent or translucent layer 16. As shown in FIGS. 5–6, the nozzles 42 of each manifold 44 are positioned at various angles with respect to the decorative covering 10 that passes beneath the nozzles 42. As the decorative covering 10 is continuously processed through the apparatus 40, the nozzles 42 reorient the platey material, such as nacreous, pearlescent pigments 18, contained within the decorative covering 10 by emitting a jet stream, such as air or other suitable disturbing media, preferably either a continuous, pulsating, or repeatable jet stream, from each nozzle 42 so that the platey material 18 within the decorative surface covering is disturbed.

After passing underneath the nozzles 42, the platey material 18 comes to rest in the decorative covering at an angle that is different from the angle that the platey material had before the decorative surface covering passed through the apparatus 40. The decorative surface covering containing the disturbed pearlescent pigments can then be set and gelled by various techniques known in the art.

In the embodiment shown in FIGS. 5–6, the desired decorative effect depends, in part, on the number of nozzles 42 installed on each manifold 44, the type of nozzle 42, the size and type of the nozzle orifice, and the processing parameters, such as oscillation speed, line speed, nozzle angle, and distance of the nozzle from the web. These nozzles and processing parameters will now be briefly discussed for the embodiment shown in FIGS. 5–6, but one skilled in the art can readily select other parameters for other apparatus.

To maximize the overall decorative effect, when six manifolds are used, in the first and second manifold the distance between the nozzles is $\frac{3}{4}''$, the distance between the nozzles in the third and fourth manifolds is $\frac{7}{8}''$, and the distance between nozzles in the fifth and sixth manifold is $2\frac{1}{4}''$ to $2\frac{1}{2}''$. Preferably, the nozzles installed on the first and second manifolds face the same direction as the web movement. The nozzles on the third and fourth manifolds impinge air at 90 degrees from the web moving direction. The nozzle orifice size used on manifold #1 through #4 is preferably about 62.5 mils. The nozzle orifice size at manifolds #5 and #6 is larger than those on manifolds #1 and #2 due to the requirements of the decorate surface design.

In one embodiment, it has been experienced that two different orifice size nozzles should not be mounted on the same manifold due to the unbalancing of air distribution. The large orifice size seems to dominate the air locally, which creates undisturbed plain spots of precoated material under the smaller orifice size nozzles. On the other hand, the use of different orifice size nozzles may result in a different and aesthetically desired effect. These undisturbed plain spots become more severe as the line speed increases. However, in certain applications these undisturbed plain spots may be desirable.

The design of the nozzle 42 determines, in part, the desired decorative pattern, the spectrum of the covered surface area, and the depth of swirling disturbance. The geometry of the nozzle design influences the volumetric flow and velocity of impinging air.

The impinging force from the nozzles used to disturb the translucent or transparent layer is proportional to the volumetric flow and velocity of the air. For a given nozzle geometry, operations that require high impinging force (at high speed) increase the pressure. Nozzles that cannot have high air pressure, should be shortened in length to increase the volumetric flow. Increasing the nozzle orifice diameter may or may not increase the impinging force, because of the opposite relationship between the orifice diameter and the volumetric flow and velocity of air.

In practical application, the distance of air passage between the nozzle tip to the translucent or transparent layer influences the effective impinging force on the layer. This force is related to the nozzle angle set up. Generally speaking, fan width (swirling pattern) of the decorative surface increases with increasing orifice size, but fan width tends to decrease with increasing line speed. To compensate, a narrower pattern is generated with fast line speed so that a larger orifice size nozzle is used.

The line speed change affects other parameters, such as the air pressure, oscillation speeds, nozzle orifice size and pulsing speeds. An increase in line speed is equivalent to an increase in the shear rate. To keep the same impinging force of air, the force should be increased. Table I lists the suggested air pressure applied at various line speeds.

TABLE I

Air Pressure vs. Line Speed

| Line Speed | Manifold Air Pressure (psi) #1 | #2 | #3 | #4 | #5 | #6 |
|---|---|---|---|---|---|---|
| 10 FPM | 30 | 30 | 25 | 25 | 30 | 30 |
| 20 FPM | 30 | 30 | 25 | 25 | 30 | 30 |
| 30 FPM | 35 | 35 | 30 | 30 | 35 | 40 |
| 40 FPM | 40 | 40 | 35 | 35 | 40 | 40 |
| 50 FPM | 45 | 45 | 40 | 40 | 45 | 45 |
| 60 FPM | 50 | 50 | 45 | 45 | 45 | 50 |

The nozzle stroke length allows for the covering of varied impinging areas and a determination of the degree of overlapping pattern. It has been experienced that the longer the stroke length, the greater the impinging area and overlapping pattern decorations design.

To maintain the same pattern and density of the reoriented platey material, the oscillation speed of the nozzles is proportionally increased with increasing line speed and decreased with decreasing line speed. Table II describes the successful oscillation speeds for various line speeds.

TABLE II

Oscillation Speed vs. Line Speed

| Line Speed | Oscillation Speed (RPM) Manifold #1 & #2 | Manifold #3 & #4 | Manifold #5 & #6 |
|---|---|---|---|
| 10 | 46 | 66 | 86 |
| 20 | 58 | 88 | 86 |
| 30 | 70 | 88 | 86 |
| 40 | 88 | 96 | 86 |
| 50 | 110 | 96 | 96 |
| 60 | 140 | 126 | 96 |

The density of the pulsing nozzle disturbances on the translucent or transparent layer gradually reduces with increasing line speeds. Table III describes the relationship of pulsing density at varied line speeds.

TABLE III

Pulsing Density vs. Line Speeds

| Line Speed | One Pulsing Cycle | Pattern Repeat Length | Pulsing Density (pulse/lin. inch) |
|---|---|---|---|
| 10 FPM | 2.4 sec. | 4.8 inch | 3.33 |
| 20 FPM | 2.4 sec. | 9.6 inch | 1.66 |
| 30 FPM | 2.4 sec. | 14.4 inch | 1.11 |
| 40 FPM | 2.4 sec. | 19.2 inch | 0.833 |
| 50 FPM | 2.4 sec. | 24.0 inch | 0.666 |
| 60 FPM | 2.4 sec. | 28.0 inch | 0.555 |

The decorative pattern becomes smaller as the line speed increases. To change the smaller patterns of air impingement, a larger orifice size nozzle or an increase in the distance between the nozzle tip to the transparent or translucent layer is used. Table IV lists the width of the decorative design with varied line speeds and air pressure for an orifice of 60 mils in diameter.

TABLE IV

| Line Speed | Air Pressure | Fan Width at ½" Height | Fan Width at 1" Height |
|---|---|---|---|
| 10 FPM | 30 psi | 0.875" | 1.013" |
| 10 FPM | 40 psi | 1" | 1.025" |
| 10 FPM | 50 psi | 1.05" | 1.038" |
| 10 FPM | 60 psi | 1.025" | 1.05" |
| 30 FPM | 30 psi | 0.6" | 0.7" |
| 30 FPM | 40 psi | 0.8" | 0.7" |
| 30 FPM | 50 psi | 0.775" | 0.925" |
| 30 FPM | 60 psi | 0.95" | 0.95" |
| 60 FPM | 50 psi | 0.6" | 0.675" |
| 60 FPM | 60 psi | 0.6" | 0.8" |

Consequently, the fan width of the decorative pattern is influenced by air pressure, line speed, the orifice size of the nozzles, and the height between the nozzle tip and the layer.

The angle of the individual nozzle to the surface layer also determines the visible drag-line or the efficiency of the impinging air force. Usually, it is preferred to have a nozzle angle in the ranges of 15°-20°. Angles greater than 20° result in smaller scale pattern, drag-line, and plain spots at a fast line speed, but they have better air efficiency. On the other hand, angles smaller than 15° exhibit good area coverage and good quality of decorative design, but they have lower air efficiency.

These techniques can be employed in the manufacture of an embossed decorative surface covering 10 of the type shown in FIG. 11. A heat-expandable composition is coated on a felt sheet material having a thickness of about 30 mils to form a foamable layer that adheres to the felt. A transparent PVC plastisol composition having a platey material dispersed therein is applied by roller coating to the foamable layer to form a decorative surface layer having a dry film thickness of about 7 mils to about 15 mils. The resulting composite is passed under six manifolds containing air nozzles to reorient the platey material in the decorative surface layer. The decorative surface layer is dried at a temperature below the foaming temperature of the foamable layer to form a solid layer having surface irregularities characterized by perceptible peaks and valleys. The magnitude of the peaks and valleys depends upon the viscosity and the flow properties of the transparent or translucent layer containing the platey material.

A smooth transparent layer having a dry film thickness of about 4 mils is provided by coating a PVC plastisol on the decorative surface layer and then drying the smooth transparent layer below the temperature at which foaming occurs in the foamable layer. The transparent layer fills the valleys and covers the peaks in the surface of the decorative surface layer to provide a smooth surface suitable for printing.

Two printing ink compositions are applied to selected portions of the smooth surface. The first ink composition contains colorants and opacifiers to form a decorative pattern over the layers, and the second ink composition contains colorants, opacifiers, foam modifiers, such as benzotriazole, in the preferred organic solvent vehicle previously described. Silicates can be incorporated as needed in the second ink composition to counteract excessive tackiness. A wearlayer is applied by coating a PVC composition over the printing design. The wearlayer has a dry film thickness of about 7 mils to about 15 mils.

The resulting composite is aged for 1 day to 10 days, preferably 8 to 10 days, at a temperature of 40° F. to 100° F., or at 300° F. to 350° F. for 1 minute to 15 minutes, to allow the benzotriazole to diffuse through the smooth vinyl layer and decorative surface layer and into the foamable layer. After aging, the composite is heated to a temperature and for a time sufficient to selectively foam the composition in the foamable layer to produce an embossing depth of about 9 mils to 25 mils. The product is suitable for use as a decorative floor covering.

Other embodiments of the invention will be apparent to one skilled in the art from consideration of the specification or with practice of the invention disclosed. It is intended that this specification be considered as exemplary only with the true scope and spirit of the invention being indicated by the claims.

What is claimed is:

1. A decorative surface covering comprising:
(a) a substrate including a foamable resinous layer containing a foaming or blowing agent;
(b) a transparent or translucent first layer overlying the substrate;
(c) platey material distributed throughout the first layer, the platey material being substantially reoriented at two or more different angles with respect to the surface of the layer, whereby the platey material reflects or diffracts light at various angles as the light passes within the transparent or translucent layer to provide an enhanced three-dimensional effect to the decorative surface covering; and
(d) a printing design overlying at least a portion of the first layer, wherein at least a portion of the printing design is comprised of a printing ink composition containing a foaming or blowing agent modifier in an amount sufficient to permeate through the first layer and into the foamable resinous layer to modify foaming in the foamable resinous layer of the substrate, and wherein the foaming or blowing agent modifier is selected from the group consisting of benzotriazole, tolytriazole, aminotriazole, trimellitic anhydride, and fumaric acid.

2. The decorative surface covering as claimed in claim 1, having a wearlayer overlying the printing design.

3. The decorative surface covering as claimed in claim 2, wherein the wearlayer is transparent or translucent.

4. The decorative surface covering as claimed in claim 3, wherein at least a portion of the printing design is transparent or translucent.

5. The decorative surface covering as claimed in claim 3, wherein at least a portion of the printing design is opaque.

6. The decorative surface covering as claimed in claim 3, wherein the foamable resinous layer overlies a flexible felt layer.

7. A decorative surface covering comprising:
(a) a substrate including a foamable resinous layer containing a foaming or blowing agent;
(b) a transparent or translucent first layer overlying the substrate;
(c) platey material distributed throughout the first layer, the platey material being substantially reoriented at two or more different angles with respect to the surface of the layer, whereby the platey material reflects or diffracts light at various angles as the light passes within the transparent or translucent layer to provide an enhanced three-dimensional effect to the decorative surface covering;
(d) a transparent or translucent second layer covering the first layer; and
(e) a printing design overlying at least a portion of the second layer, wherein at least a portion of the printing design is comprised of a printing ink composition containing a foaming or blowing agent modifier in an amount sufficient to permeate through the first layer and through the second layer and to modify foaming in the foamable resinous layer of the substrate, and wherein the foaming or blowing agent modifier is selected from the group consisting of benzotriazole, tolytriazole, aminotriazole, trimellitic anhydride, and fumaric acid.

8. The decorative surface covering as claimed in claim 7, wherein the foaming or blowing agent modifier is benzotriazole in a vehicle.

9. The decorative surface covering as claimed in claim 8, wherein the vehicle contains at least one ingredient selected from the group consisting of resin binder, colorant, organic solvent, and printing adjuvant.

10. The decorative surface covering as claimed in claim 9, wherein the organic solvent consists essentially of a mixture of methyl ethyl ketone, methyl isobutyl ketone, and methyl alcohol.

11. The decorative surface covering as claimed in claim 9, wherein the second layer is transparent or translucent.

12. The decorative surface covering as claimed in claim 11, having a wearlayer overlying the printing design.

13. The decorative surface covering as claimed in claim 12, wherein the wearlayer is transparent or translucent.

14. The decorative surface covering as claimed in claim 12, wherein at least a portion of the printing design is transparent or translucent.

15. The decorative surface covering as claimed in claim 12, wherein at least a portion of the printing design is opaque.

16. The decorative surface covering as claimed in claim 15, wherein the foamable resinous layer overlies a flexible felt layer.

* * * * *